(No Model.)

G. A. TOWER.
HOSE HANGER.

No. 508,786. Patented Nov. 14, 1893.

Witnesses

Inventor
George A. Tower
By his Attorneys.

United States Patent Office.

GEORGE A. TOWER, OF RICHMOND, VIRGINIA, ASSIGNOR OF ONE-HALF TO E. VICTOR WILLIAMS, OF SAME PLACE.

HOSE-HANGER.

SPECIFICATION forming part of Letters Patent No. 508,786, dated November 14, 1893.

Application filed May 22, 1893. Serial No. 475,031. (No model.)

*To all whom it may concern:*

Be it known that I, GEORGE A. TOWER, a citizen of the United States, residing at Richmond, in the county of Henrico and State of Virginia, have invented a new and useful Hose-Hanger, of which the following is a specification.

The invention relates to improvements in hose hangers.

The object of the present invention is to provide for use in factories, warehouses, mills and analogous structures, a hose support adapted to hold a line of hose extended and ready for instant use whereby the necessity and disadvantages of winding the same on reels, or folding on racks, are obviated said hose support being adapted to automatically release the hose and allow the same to drop to the floor when water is turned on and it is desired to use the hose.

This invention consists broadly of a series or line of hose-engaging devices adapted to engage and support an extended line of collapsed hose, each of the devices being provided with an arm or arms adapted to yield outwardly and automatically release and drop the hose when the same is expanded by the passage of water through it, as and for the purpose described.

Figure 1:
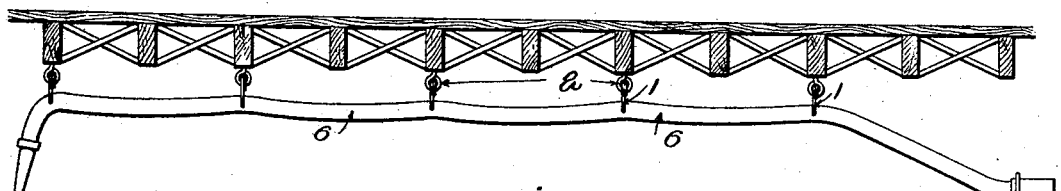
Figure 2:
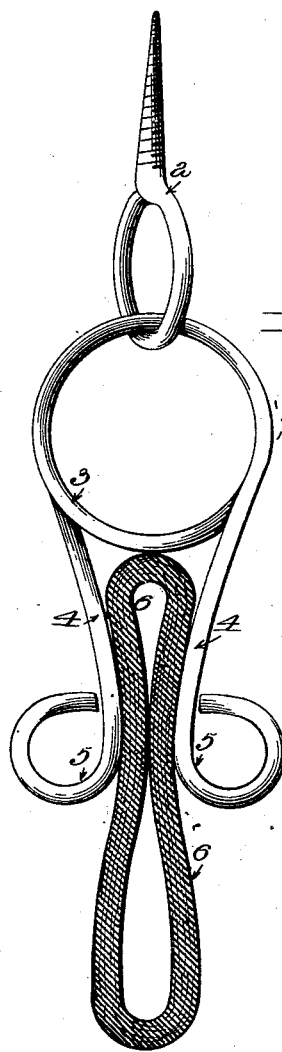
Figure 3:
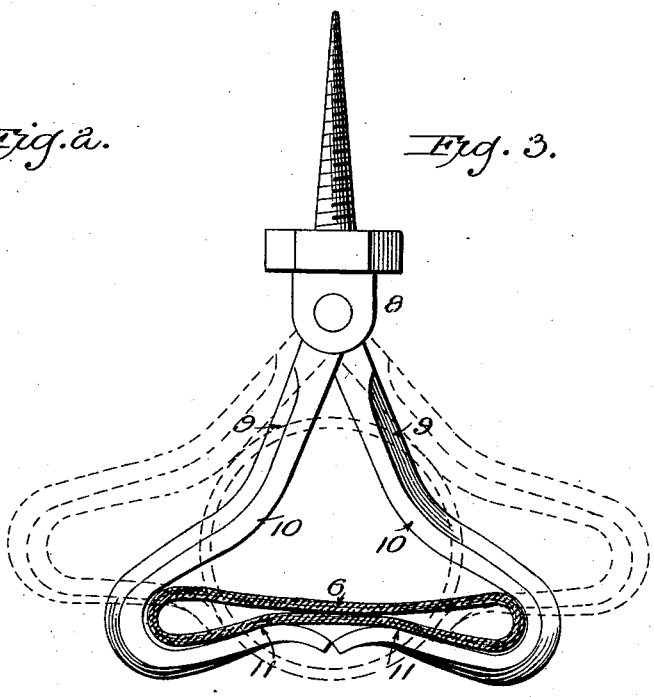

In the drawings—Figure 1 is an elevation of a hose connected with a water pipe and supported by one form of hanger constructed in accordance with this invention. Fig. 2 is a detail, one form of hanger clasping a collapsed hose. Fig. 3 is an elevation of another form of hanger.

Like numerals of reference indicate corresponding parts in all the figures of the drawings.

1 designates a hanger adapted to be suspended by a screw eye 2 from a ceiling or similar support and consisting of a single piece of resilient metal formed into an upper spring-coil 3 and depending hose-supporting sides 4. The spring coil 3 forms an eye, and is linked into the screw eye, and its ends are continued downward to form the sides 4. The depending sides 4 converge toward their lower ends 5 which are bent outward upon themselves to avoid any projections or points which might puncture or otherwise damage a hose; said sides being adapted to receive between them and firmly clasp a hose 6 when the latter is collapsed and is not in use, as illustrated in Fig. 2 of the accompanying drawings. The spring or resiliency imparted to the sides 4 by the coil 3, is sufficient to support the weight of the hose when the latter is contracted; but as soon as the water is turned on from a pipe 7 the hose expands or swells forcing the sides 4 outward and automatically releasing itself both by its expansion and its increased weight. As soon as the hose expands it falls from the hangers; and it may be readily reinserted in the hangers when contracted as the outwardly bent ends of the sides form a partial flaring entrance to facilitate such insertion.

In Fig. 3 of the accompanying drawings is illustrated a modification of the invention consisting of a screw eye which is provided with perforated ears 8, and depending hose supporting sides 9, which have their upper ends pivoted between the ears. The hose supporting sides 9 extend outward forming inner shoulders 10, and are bent or extended inward to provide lower supporting portions 11. The lower portions of the sides are hook-shaped, so as to embrace the collapsed hose, which rests upon the bottom inwardly-turned portions 11 as shown. As soon as the hose is expanded, by the water forced through it, it presses outwardly against the shoulders 10 and swings the arms apart sufficiently to release itself automatically, as illustrated by dotted lines in Fig. 3 of the accompanying drawings.

It will be apparent that the supporting devices are simple and inexpensive in construction and reliable in operation, and that they are adapted to support the hose fully extended ready for instant use, and are capable of automatically releasing and causing the hose to drop as soon as water is forced through the latter.

It has been found by experience that it is exceedingly injurious to rubber-line hose to wind the same on reels or fold it on racks, as the bends and kinks incident to such folding and winding causes the rubber to rot and crack, and in a short time destroys and renders useless such hose. It will thus be seen that it is of great importance that such hose should be supported out of the way, in an extended position, free from kinks and bends, and that it is also exceedingly desirable to remove it quickly from the supports in position for instant use in case of fire or like emergency. The automatically operating hangers herein shown and described accomplish these results, thus providing devices that enable a hose to be brought into use in much less time than heretofore. It is also of great advantage because of the fact that fire insurance rates are determined by the efficiency of the means employed for extinguishing a conflagration, the more efficient and reliable the means employed the lower being the rates. It will also be noticed that in releasing the hose from the hangers for use, there is no liability of causing a kink or bend and shutting off the water, as is often the case in removing hose from reels and racks, previous to turning on the water.

Changes in the form, proportion and the minor details of construction may be resorted to without departing from the principle or sacrificing any of the advantages of this invention.

While it is desired to have the hose-engaging devices depend from an overhead support as shown, yet it is obvious that they may be used in other positions—for instance, they may be secured to a convenient wall or to posts.

What I claim is—

1. A hose-holder adapted to hold a line of hose in an extended or unfolded position, said hose-holder consisting of a support and a line of separated independent hose-engaging devices attached to said support and provided with arms adapted to embrace the collapsed hose at intervals along its extended length, each of said devices having a yielding arm adapted to be forced outwardly and automatically release and drop the hose when water is passed therethrough, substantially as and for the purposes described.

2. In a hose-holder adapted to support an extended line of hose, the combination of a series or line of hose engaging devices adapted to engage the collapsed hose at intervals along its extended length, each of said devices consisting of a pair of arms one of which is adapted to normally swing inwardly and yield outwardly, whereby the expansion of the hose by the passage of water therethrough will automatically release and drop it, substantially as and for the purposes described.

3. The combination with a support, of a series of hangers arranged in line to receive a hose without folding the same, and provided with depending outwardly swinging hose supporting sides receiving a hose between them when the same is in a contracted state, and adapted to be forced apart to release the hose when water is forced through the same, substantially as described.

4. The combination with a support, of a series of hangers arranged in line to receive a hose when the latter is extended, and each constructed of resilient metal and composed of an upper coil, and depending hose supporting sides adapted to receive and hold between them a hose when the latter is contracted, substantially as and for the purpose described.

5. A hose hanger provided with a screw eye and constructed of a single piece of resilient metal and composed of a spring coil linked into the screw eye, and depending hose supporting sides having their lower ends bent outward to form a flaring entrance, substantially as described.

In testimony that I claim the foregoing as my own I have hereto affixed my signature in the presence of two witnesses.

GEO. A. TOWER.

Witnesses:
J. H. SIGGERS,
GEO. C. SHOEMAKER.